(12) United States Patent
Vasquez et al.

(10) Patent No.: US 12,123,079 B2
(45) Date of Patent: Oct. 22, 2024

(54) ODS ALLOY POWDER, METHOD FOR PRODUCING SAME BY MEANS OF PLASMA TREATMENT, AND USE THEREOF

(71) Applicant: COMMISSARIAT A L'ENERGIE ATOMIQUE ET AUX ENERGIES ALTERNATIVES, Paris (FR)

(72) Inventors: Elodie Vasquez, Montrouge (FR); Pierre-François Giroux, Châtenay-Malabry (FR); Fernando Lomello, Gif-sur-Yvette (FR); Hicham Maskrot, Montlhery (FR); Yann Leconte, Saint Remy les Chevreuse (FR); Frédéric Schuster, St. Germain-en-Laye (FR); Khalil Abdelkebir, Saint-Cyr-en-Val (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 18 days.

(21) Appl. No.: 17/052,076

(22) PCT Filed: May 3, 2019

(86) PCT No.: PCT/FR2019/000067
§ 371 (c)(1),
(2) Date: Oct. 30, 2020

(87) PCT Pub. No.: WO2019/211534
PCT Pub. Date: Nov. 7, 2019

(65) Prior Publication Data
US 2021/0230722 A1    Jul. 29, 2021

(30) Foreign Application Priority Data
May 3, 2018   (FR) ...................... 1853836

(51) Int. Cl.
*C22C 32/00*   (2006.01)
*B22F 1/065*   (2022.01)
(Continued)

(52) U.S. Cl.
CPC .......... *C22C 32/0026* (2013.01); *B22F 1/065* (2022.01); *B22F 9/14* (2013.01);
(Continued)

(58) Field of Classification Search
CPC . C22C 32/0026; C22C 1/0416; C22C 1/0433; C22C 19/007; C22C 21/08;
(Continued)

(56) References Cited

U.S. PATENT DOCUMENTS

| 4,689,075 A | 8/1987 | Uda et al. |
| 4,755,221 A | 7/1988 | Paliwal. et al. |

(Continued)

FOREIGN PATENT DOCUMENTS

| CN | 102251131 A | 11/2011 |
| CN | 103060591 A | 4/2013 |

(Continued)

OTHER PUBLICATIONS

CN 102251131 machine translation (Year: 2011).*
(Continued)

*Primary Examiner* — Paul A Wartalowicz
*Assistant Examiner* — Stephani Hill
(74) *Attorney, Agent, or Firm* — Oblon, McClelland, Maier & Neustadt, L.L.P.

(57) ABSTRACT

A method for producing a reinforced alloy powder containing a metal matrix in which crystalline oxide particles are dispersed, including: (i) providing a powder mixture including a parent metal powder including a master alloy for forming the metal matrix and an additional powder including an intermediate; (ii) milling the powder mixture by a
(Continued)

mechanical synthesis process to make a precursor powder; and (iii) subjecting the precursor powder to a thermal plasma generated by a plasma torch including a plasma gas. The master alloy is iron-based, nickel-based, or aluminum-based. The intermediate is at least one of $YFe_3$, $Y_2O_3$, $Fe_2O_3$, $Fe_2Ti$, $FeCrWTi$, $TiH_2$, $TiO_2$, $Al_2O_3$, $HfO_2$, $SiO_2$, $ZrO_2$, $ThO_2$, and $MgO$. In (iii), the precursor powder is injected into the plasma torch at a flow rate of 10-30 g/min, a power of the plasma torch is 20-40 kW, and a pressure in a reaction chamber of the plasma torch is 25-100 kPa.

45 Claims, 4 Drawing Sheets (51) Int. Cl.
| | | |
|---|---|---|
| | B22F 9/14 | (2006.01) |
| | C22C 1/04 | (2023.01) |
| | C22C 1/10 | (2023.01) |
| | C22C 19/00 | (2006.01) |
| | C22C 21/08 | (2006.01) |
| | C22C 33/02 | (2006.01) |
| | C22C 38/06 | (2006.01) |
| | C22C 38/18 | (2006.01) |

(52) U.S. Cl.
CPC .......... *C22C 1/0416* (2013.01); *C22C 1/0433* (2013.01); *C22C 1/1084* (2013.01); *C22C 19/007* (2013.01); *C22C 21/08* (2013.01); *C22C 33/02* (2013.01); *C22C 33/0261* (2023.01); *C22C 38/06* (2013.01); *C22C 38/18* (2013.01); *B22F 2202/13* (2013.01); *C22C 2200/00* (2013.01)

(58) Field of Classification Search
CPC .......... C22C 33/02; C22C 38/06; C22C 38/18; C22C 2200/00; C22C 1/059; B22F 9/14; B22F 2202/13; B22F 1/065
See application file for complete search history.

(56) References Cited

U.S. PATENT DOCUMENTS

| | | | |
|---|---|---|---|
| 2011/0103961 A1 | 5/2011 | Glover et al. | |
| 2012/0201266 A1* | 8/2012 | Boulos | H05H 1/42 373/18 |
| 2015/0093279 A1* | 4/2015 | Kington | B22F 10/30 419/19 |
| 2016/0175929 A1 | 6/2016 | Colin et al. | |

FOREIGN PATENT DOCUMENTS

| | | | |
|---|---|---|---|
| CN | 105562700 A * | 5/2016 | |
| CN | 105764634 A | 7/2016 | |
| CN | 107760933 A | 3/2018 | |
| CN | 108856725 A * | 11/2018 | |
| CN | 115896565 A * | 4/2023 | |
| JP | 07278726 A * | 10/1995 | |
| JP | 2003-139273 A | 5/2003 | |
| JP | 2014-198900 A | 10/2014 | |
| JP | 2016-532773 A | 10/2016 | |
| WO | WO 86/06366 A1 | 11/1986 | |
| WO | WO-2017011900 A1 * | 1/2017 | ............ B22F 1/0014 |
| WO | WO 2018/049051 A1 | 3/2018 | |

OTHER PUBLICATIONS

Incoloy Alloy MA956 ODS Steel (Year: 2022).*
X. Fan, Statistical design of experiments for the spheroidization of powdered alumina by induction plasma processing, 1998 (Year: 1998).*
C. Suryanarayana "Mechanical alloying and milling", Progress in Materials Science, 2001, 46, pp. 1-184 (Year: 2001).*
O'Dell et al. Plasma alloying and spheroidization process and development. JMEPEG (2004) 13:461-467. (Year: 2004).*
JP H07-278726 machine translation (Year: 1995).*
Crawmer. Thermal Spray Processes. ASM Handbook. vol. 5A, Thermal Spray Technology, 2013. 33-53. (Year: 2013).*
Fauchais et al. Plasma spraying: from plasma generation to coating structure. Advances in Heat Transfer. vol. 40 (2007) 205-344. (Year: 2007).*
Kumar et al. Plasma spheroidization of iron powders in a non-transferred DC thermal plasma jet. Materials Characterization 59 (2008) 781-785. (Year: 2008).*
CN 108856725 machine translation (Year: 2018).*
Boulos. Thermal Plasma Processing. IEEE Transactions on Plasma Science. vol. 19, No. 6, Dec. 1991 (Year: 1991).*
CN 103060591 machine translation (Year: 2013).*
Peng et al. Effect of Plasma Spheroidization Process on the Microstructure and Crystallographic Phases of Silica, Alumina and Nickel Particles. Plasma Science and Technology, vol. 9, No. 5, Oct. 2007. 611-615. (Year: 2007).*
Sakuta et al. Spheroidization of Nickel Alloy Powders by Using Induction Thermal Plasma. Proc. Jpn. Symp. Plasma Chem. vol. 5, 1992. 269-274. (Year: 1992).*
Sista et al. Spherical metal powders through RF plasma spheroidization. Powder Technology. 400 (2022) 117225. (Year: 2022).*
CN 115896565 machine translation (Year: 2023).*
Lagerbom et al. Experiences in Powder Plasma Spheroidization. Euro PM2018 Proceedings—Powder for AM V. Oct. 14-18, 2018. Bilbao, Spain. (Year: 2018).*
Yang et al. Spheroidization and densification of nickel powders by rf induction plasma. Report (1991), Gov. Rep. Announce. Index (U.S.) 1992, 92(11), Abstr. No. 229,433. STN abstract. (Year: 1992).*
CN 105562700 machine translation (Year: 2016).*
Notice of Reasons for Rejection issued Dec. 13, 2021 in Japanese Patent Application No. 2020-561784 (with English machine translation), 11 pages.
International Search Report issued Jul. 5, 2019 in PCT/FR2019/000067 (submitting English translation only), 3 pages.
Longzhou Ma, et al., "Characterization of Oxide-Dispersion-Strengthened (ODS) Alloy Powders Processed by Mechano-Chemical-Bonding (MCB) and Balling Milling (Bm)" KONA Powder and Particle Journal, No. 31, XP055570738, Jan. 1, 2014, pp. 146-155.
Pei He, et al., "An in Situ SANS Study of Nanoparticles Formation in 9Cr ODS Steel Powders" Materials Letters, vol. 209, Aug. 15, 2017, pp. 535-538.
Werner Oesterle, et al. "Mikrostmktur eines ODS-Pulvers auf Nikkelbasis nach dem mechanischen Legieren" Zeitschrift Fur Metallkunde, Retrieved from the Internet: https://www.tib.eu/en/search/id/BLSE%3AEN004127821/Mikrostruktur-eines-ODS-Pulvers-auf-Nikkelbasis/ [retrieved on Mar. 18, 2019], XP055570731, Feb. 1, 1993, p. 85-90.
Chinese Office Action Dated Sep. 15, 2022, in Chinese Patent Application No. 201980044821.6 (with English Translation).

\* cited by examiner

ODS ALLOY POWDER, METHOD FOR PRODUCING SAME BY MEANS OF PLASMA TREATMENT, AND USE THEREOF

CROSS-REFERENCE TO RELATED APPLICATIONS

The present application is the national stage of international application PCT/FR2019/000067, filed on May 3, 2019, and claims the benefit of the filing date of French Appl. No. 1853836, filed on May 3, 2018.

DESCRIPTION

Technical Field

The present invention relates to the field of oxide dispersion strengthened alloys (called "ODS" alloy according to the English acronym for "Oxides Dispersion Strengthened"), the oxides constituting reinforcements of the metal matrix in which they are dispersed.

The invention relates more particularly to a powder of an ODS alloy, as well as the method for producing same.

Technical Background

Atomization is the commonest method for making a metal powder. It consists of spraying into fine droplets a stream of molten metal exposed to a gas jet or a water jet at high pressure in order to obtain the powder.

However, atomization is not suitable for making an ODS alloy powder: it is often impossible to provide the raw material that is indispensable for the atomization, which is a base metal in massive form (such as for example in ingot form) which moreover should contain oxide reinforcements that are dispersed more or less uniformly therein.

In fact, the oxide reinforcements do not melt at the same temperature as the base metal. They then agglomerate on account of problems of wettability of the reinforcements in the molten base metal and differences in density between the reinforcements and the metal. Therefore in practice, foundry processes are not used for forming ODS alloys.

For forming ODS alloys, the method of production by mechanical synthesis is now preferred. This powder metallurgy technique is described for example in the work by C. Suryanarayana "Mechanical alloying and milling", Progress in Materials Science, 2001, 46, 1-184 [reference 1]. It is based on the high-energy co-milling of a first powder of the base metal (optionally pre-alloyed) obtained beforehand by atomization and intended to form the metal matrix with at least one second metal powder intended to form an oxide reinforcement in the metal matrix. During milling, some or all of the atoms constituting the second metal powder are incorporated in the metal matrix, optionally and most probably in the form of solid solution.

However, at this stage of the mechanical synthesis process, the oxides are not formed (at best, some of the oxides may be in the form of amorphous oxides, i.e. not crystalline: however, there is a debate within the scientific community as to whether these noncrystalline oxides correspond partly to the corresponding constituent atoms that would be in solid solution in the metal matrix) and whether the corresponding reinforcements have seeded within the milled powder particles. Only an additional step of consolidation (for example by hot extrusion or hot isostatic pressing) causes the oxide reinforcements to grow within the metal matrix for finally obtaining an ODS alloy.

It is only after formation of oxide particles that constitute sufficient reinforcements dispersed in the metal matrix that a true reinforced alloy is formed, thus fully justifying the designation "ODS alloy".

Now, it is difficult to control the formation of the ODS alloy powder thus obtained, notably its composition, its size, its morphology and the distribution of the oxide reinforcements in the metal matrix.

SUMMARY OF THE INVENTION

One of the aims of the invention is therefore to avoid or attenuate one or more of the drawbacks described above, by proposing a new method for producing an ODS alloy powder, more particularly having optimized characteristics of composition and/or microstructure.

The present invention thus relates to a method for producing a powder of a reinforced alloy in which the grains forming the particles of the powder comprise a metal matrix, in the volume of which crystalline oxide particles (ODS alloy) are dispersed, said method comprising the following successive steps:

i) providing a powder mixture to be milled comprising:
- a parent metal powder comprising a master alloy intended to form the metal matrix;
- an additional powder comprising at least one intermediate intended to incorporate in the metal matrix, optionally in the form of a solid solution, atoms intended to form the dispersed oxide particles;

ii) milling the powder mixture in a gaseous milling medium according to a mechanical synthesis process for making a precursor powder comprising a metal matrix incorporating said atoms, optionally in the form of a solid solution;

iii) subjecting the precursor powder to a thermal plasma generated by a plasma torch comprising a plasma gas, in order to obtain the reinforced alloy powder.

According to the method of production of the invention, the combination of a step of milling by mechanical synthesis and a step of plasma treatment produces an ODS alloy powder comprising crystalline oxide particles as reinforcements of the metal matrix.

Such a result is unexpected for a person skilled in the art, for the following reasons:

treatment of a powder by a thermal plasma typically causes fusion of said powder. A thermal plasma (also called "hot plasma") is a very energetic plasma in which the electrons and the ions affect the behavior of the plasma. A thermal plasma contrasts with a cold plasma, which is less energetic and in which only the electrons affect the behavior of the plasma.

Now, as stated above, a fusion technique is absolutely not recommended for forming an ODS alloy, which is why mechanical synthesis was developed, as noted in the article reviewing the prior art: D. J. Lloyd, "Particle reinforced aluminium and magnesium matrix composites"; *International materials reviews*, 1994, Vol. 39, No. 1, pages 1 to 23. [reference 2].

This is also why the use of hot isostatic pressing at too high a temperature is generally avoided.

In fact, the oxide particles generally melt at a temperature above that of the master alloy intended to form the metal matrix. They therefore have a tendency to agglomerate owing to their low wettability in the molten metal and their density, which is different from that of the metal. In such conditions, it is then impossible to obtain an alloy reinforced with oxide reinforcements dispersed relatively uniformly in the metal matrix, in particular reinforcements of nanometric size.

after mechanical synthesis, the atoms intended to form the oxide particles are distributed in the metal matrix, optionally and most probably in the form of a solid solution, although this is debated within the scientific community. It is only in the subsequent step of consolidation that the oxide particles will seed and then crystallize. Now, this consolidation step as carried out in the prior art is not favorable for controlling the characteristics of the reinforcements obtained; notably their size, their morphology, their degree of crystallization and/or their distribution in the metal matrix.

plasma torches are provided for treating and obtaining a powder with particles of micrometric size. To obtain a nanopowder, i.e. a powder with particles of nanometric size, the plasma torch must incorporate a quench ring. The plasma torch treatment techniques are highly energetic and without additional equipment of the quench ring type, a person skilled in the art expects that a plasma torch treatment will not form a nanopowder, as well as nanoprecipitates within a powder particle as the precipitates would agglomerate there.

Now, against the prejudice according to which the use of a plasma treatment step, during which the powders are molten, would not allow an ODS alloy powder with optimized characteristics to be obtained, the inventors have shown that the oxide particles do not coalesce during the plasma treatment step.

On the contrary, they remain individualized during their precipitation in two steps:
i) seeding during which the metal atoms migrate in the metal matrix and meet to form oxide molecules actually within the powder particles, and then
ii) crystallization comprising growth of oxide crystals to form the oxide particles.

In parallel, still during the plasma treatment step, the master alloy generally crystallizes wholly or partly in the bulk to form the metal matrix. The crystalline oxide reinforcements thus formed are dispersed uniformly in the wholly or partly crystalline metal matrix.

Advantageously, the method of production of the invention thus makes it possible to produce an ODS alloy with very good control of the size and of the dispersion of the oxide precipitates reinforcing the metal matrix of the ODS alloy.

During the first step of the method of production of the invention, the powder mixture is milled according to a mechanical synthesis process. The powder mixture comprises the parent metal powder and the additional powder.

Generally, when the milling conditions are adjusted during step ii) of mechanical synthesis, the parent metal powder and the additional powder are mixed intimately, in such a way that all the atoms of the intermediate that are intended to form the dispersed oxide particles are incorporated, optionally and most probably in the form of a solid solution, in the master alloy, which then forms the metal matrix.

Regarding the characteristics of these powders, there is no real limitation to the particle size of the powders making up the powder mixture used in the method of production of the invention.

Most often, the particles of the parent powder have a median diameter ($d_{50}$) between 1 μm and 200 μm, or even between 20 μm and 80 μm, typically between 60 μm and 65 μm.

The median diameter ($d_{50}$) of a powder is the size for which 50% of the population of the particles making up this powder has a size smaller than $d_{50}$.

It may be determined by a technique such as the laser diffraction method by means of a granulometer as described for example in standard ISO 13320 (edition 2009-12-01).

The parent metal powder comprises the master alloy, which may be selected from an iron-based alloy, a nickel-based alloy or an aluminum-based alloy.

The iron-based alloy may comprise, by weight:
10% to 30% of chromium.
10% to 30% of aluminum.
8% to 25% of chromium and 3 to 8 wt. % of aluminum.

The iron-based alloy may be a steel, for example an austenitic, martensitic or ferritic steel, if applicable respecting the above compositions by weight.

The nickel-based alloy may comprise, by weight:
109 to 409 of chromium, such as for example Inconel® 600 comprising 14% to 17% of chromium.
10% to 40% of chromium, 0.2% to 5% of aluminum, 0.3% to 5% of titanium, 0% to 5% of tungsten, 0% to 2% of molybdenum and 0% to 2% of tantalum, such as for example Inconel® 625 or 718 comprising 20% to 23% or 17% to 21% of chromium, respectively.
10% to 30% of aluminum.

Generally, the nickel-based alloy may be an Inconel®.

When the master alloy is an iron-based alloy or a nickel-based alloy, the powder mixture may comprise by weight 0.1% to 2.5% of the additional powder, or even 0.1% to 0.5%.

The aluminum-based alloy may comprise, by weight, from 0% to 1% of iron (or even from 04 to 0.5% of iron), from 0% to 1% of silicon and from 0% to 1% of magnesium.

There are for example the following compositions by weight:
aluminum alloy 1100 comprising 0.95% of iron, 0.05% of magnesium, 0.2% of copper, and 0.1% of zinc;
aluminum alloy 6262 comprising up to 0.7% of iron;
an aluminum alloy of series 1000, for example such as aluminum alloy 1050 containing less than 0.4% of iron, less than 0.25% of silicon and no magnesium;
an aluminum alloy of series 6000, for example such as aluminum alloy 6063 containing less than 0.35% of iron, less than 0.6% of silicon and less than 0.9% of magnesium.

Iron is most often an impurity, and silicon improves the fluidity of the alloy.

When the master alloy is an aluminum-based alloy, the powder mixture may comprise 0.2% to 5% by weight of the additional powder.

Generally, the proportion of the precursor powder that precipitates in the form of oxide particles during step iii) of plasma treatment may be high owing to the good efficiency of the method of production of the invention. This proportion may typically be from 80% (or even 90%) to 100%. When it is 100%, all the atoms intended to form the dispersed oxide particles have precipitated in the form of reinforcements in the metal matrix of the ODS alloy. Thus, depending on the additional proportion, the proportion of the atoms intended to form the dispersed oxide particles present in the metal matrix of the ODS alloy in a form other than a particle of crystalline oxide is reduced or is even close to or equal to 0%.

Owing to this property of the method of production of the invention, the proportion of additional powder in the powder mixture to be milled may therefore be reduced. During the plasma treatment step iii), this promotes the formation of oxide particles of reduced size (for example in the form of nanoreinforcements) and uniform distribution thereof in the metal matrix of the ODS alloy. This also lowers the cost of the manufacturing process.

This proportion may thus be from 0.1% to 0.3%, or even 0.1% to 0.2% of additional powder in the powder mixture to be milled.

Regarding the additional powder, its particles generally have a median diameter ($d_{50}$) between 1 μm and 80 μm. This median diameter may thus be lower than that of the parent powder, which promotes incorporation of the atoms intended to form the dispersed oxide particles in the master alloy of the parent metal powder.

The intermediate intended to incorporate the atoms intended to form the dispersed oxide particles may be selected from $YFe_3$, $Y_2O_3$, $Fe_2O_3$, $Fe_2Ti$, FeCrWTi, $TiH_2$, $TiO_2$, $Al_2O_3$, $HfO_2$, $SiO_2$, $ZrO_2$, $ThO_2$, MgO or mixtures thereof.

A compound that is not an oxide (for example $YFe_3$, $Fe_2Ti$, FeCrWTi, $TiH_2$) is a precursor compound intended to form after chemical reaction, in the course of the method of production of the invention, the corresponding metal oxide that is present in the reinforced alloy at the end of this process, more particularly in the form of crystalline oxide particles.

The atoms intended to form the dispersed oxide particles may therefore comprise at least one metal atom selected from yttrium, titanium, iron, chromium, tungsten, silicon, zirconium, thorium, magnesium, aluminum or hafnium.

Most often, the intermediate is a metal oxide and therefore comprises at least one oxygen atom intended to be included in the composition of the oxide particle.

When the intermediate does not comprise an oxygen atom, for example in the case of an intermetallic compound (such as for example $Fe_2Ti$ or FeCrWTi) or a hydride (such as for example $TiH_2$), the oxygen is supplied by another intermediate of the metal oxide type, optionally supplemented with oxygen present in the master alloy.

The powder mixture to be milled is submitted to step ii) of milling according to a mechanical synthesis process.

This step may be carried out in a mill selected for example from a ball mill or an attritor.

The gaseous milling medium is generally an atmosphere of controlled composition. It may comprise hydrogen, argon, helium, nitrogen, air or mixtures thereof.

The precursor powder obtained at the end of the milling step ii) is then submitted to step iii) of thermal plasma treatment.

The parameters of the plasma torch operated during the plasma treatment of step iii) are those used conventionally in the field of powder manufacture, for example in the following studies:

Fan, X., Gitzhofer, F., Boulos, M. "Statistical Design of Experiments for the Spheroidization of Powdered Alumina by Induction Plasma Processing", J Therm Spray Tech 1998, 7 (2), 247-253 [reference 3], Jiang, X.-L., Boulos, M. "Induction Plasma Spheroidization of Tungsten and Molybdenum Powders", Transactions of Nonferrous Metals Society of China 2006, 16 (1), 13-17 [reference 4], Ye, R., Ishigaki, T., Jurewicz, J., Proulx, P., Boulos, M. I. "In-Flight Spheroidization of Alumina Powders in Ar—H2 and Ar—N2 Induction Plasmas", Plasma Chem Plasma Process 2004, 24 (4), 555-571 [reference 5].

These studies show that there are no strict operating parameters and that a person skilled in the art can easily adapt them, for example by repetition, as a function of the amount of powder to be treated and/or the type of powders required. However, indicative operating parameters suitable for the method of production of the invention are stated hereunder.

The plasma torch used may be an inductively coupled radio frequency plasma torch, a blown arc torch or a transferred arc torch.

The radio frequency plasma operates without an electrode. Energy transfer is effected by inductive coupling: a magnetic field is applied to the plasma gas circulating inside the induction coil in order to form the plasma.

The power of the plasma torch may be between 10 kW and 80 kW (more particularly between 10 kW and 40 kW), or even between 20 kW and 80 kW (more particularly between 20 kW and 40 kW).

The thermal plasma used in step iii) of the method of production of the invention may be a plasma as described for example in the document: P. Fauchais, "Plasmas thermiques: aspects fondamentaux" ["Thermal plasmas: basic aspects"], Techniques de l'ingénieur, Part D2810 V1, 2005) [reference 6].

The thermal plasma may be at a plasma temperature between 200° C. and 12000° C., for example between 700° C. and 4000° C. in order to melt aluminum or magnesium, or tungsten which melts at 3500° C. This temperature is generally sufficient to melt the species, more particularly those comprising a metal atom, which make up the precursor powder.

The thermal plasma may be such that its electron density is between $10^{14}$ $m^{-3}$ and $10^{26}$ $m^{-3}$, or even between $10^{18}$ $m^{-3}$ and $10^{26}$ $m^{-3}$ notably for arc plasmas.

The ionization energies may be between 0.5 eV and 50 eV.

At these temperatures and/or energies of the thermal plasma, the plasma gas contained in the plasma torch is generally fully ionized. For this, the plasma gas may be selected from argon, helium, nitrogen or mixtures thereof. It generally constitutes the central gas of the plasma torch, into which it may be fed at a flow rate between 10 liters/min and 40 liters/min.

At the start of step iii), the pressure in the reaction chamber of the plasma torch may be low (for example below 200 Pa) to promote formation of the plasma by facilitating ionization of the plasma gas. However, during step iii), the pressure in the reaction chamber of the plasma torch is generally between 25 kPa and 100 kPa. The lower this pressure, the more the flow rate of injection and therefore the flow rate of passage of the precursor powder through the plasma torch is accelerated.

For an inductively coupled radio frequency plasma torch, the reaction chamber corresponds to the confinement tube.

When the precursor powder comes into contact with the plasma, the reaction of precipitation (i.e. seeding and then growth) of the oxide particles is activated thermally and occurs almost instantaneously.

The flow rate of injection of the precursor powder into the plasma torch may however be adjusted, more particularly as a function of the composition and/or amount of powder to be treated.

The precursor powder may be injected into the plasma torch at a flow rate between 10 grams/min and 45 grams/min, preferably between 10 grams/min and 30 grams/min, even more preferably between 10 grams/min and 19 grams/min. This flow rate of introduction of the precursor powder may be set independently of the flow rate of the central gas, even if it can be increased at least partially by increasing the flow rates of plasma gas and/or sheath gas.

The precursor powder may be injected into the plasma torch by vibration, with an endless screw or a rotating disk.

Injection in the upstream part (with reference to the stream of plasma gas) of the reaction chamber is generally coupled to a fast powder flow rate, whereas injection in the downstream part of the reaction chamber is coupled to a slower powder flow rate, notably in order to optimize the travel time of the precursor powder in the reaction chamber. In fact, the part upstream of the thermal plasma in the plasma torch is at a higher temperature, which may not be optimum. Moreover, a high powder flow rate prevents the powder being dispersed by recirculation within the plasma.

For example, a good compromise may be to set the height of the outlet of the injector described hereunder so that it opens into the upstream first third of the reaction chamber.

In order to maximize the proportion of intermediate that precipitates in the form of oxide particles, it may also be wise to couple a moderate plasma torch power with a moderate flow rate of injection of precursor powder.

Typically, a plasma torch power between 10 kW and 40 kW (or even between 10 kW and 30 kW) coupled to a flow rate of precursor powder between 10 g/min and 30 g/min (or even between 10 g/min and 19 g/min) may improve:
- the proportion of oxide particles that have precipitated: typically, this improved proportion is such that 80 to 100 wt. % of the metal atom contained in the whole of the reinforced alloy is in the form of crystalline oxide particles, preferably 90% to 100%, even more preferably 100%; and/or
- the average circularity coefficient of the particles of the reinforced alloy powder: typically for 80 to 100 wt. % of the crystalline oxide particles (preferably 90% to 100%, even more preferably for 100%), this improved average circularity coefficient is between 0.95 and 1, or even between 0.98 and 1.

The precursor powder and/or the plasma gas may be introduced into the plasma torch via an injector.

The precursor powder may be injected into the plasma torch simultaneously with the plasma gas, for example via the injector.

The injector may be swept on its outside surface with a sheath gas, which may help to stabilize the plasma and increase the efficiency of the method of production of the invention.

The sheath gas may be fed into the plasma torch at a flow rate between 10 liters/min and 100 liters/min.

It may be selected from argon, helium, nitrogen, hydrogen or mixtures thereof.

The sheath gas may be a mixture of at least one principal sheath gas and at least one additional sheath gas.

The principal sheath gas (most often argon) may be fed into the plasma torch at a high flow rate, for example a flow rate between 40 liters/min and 100 liters/min.

The additional sheath gas has good thermal conductivity, which improves heat transfer between the plasma gas and the precursor powder. It is for example helium, nitrogen or preferably hydrogen for its reducing properties, which limit surface oxidation of the particles of precursor powder. The additional sheath gas may be injected into the plasma torch at a flow rate lower than the flow rate of feed of the principal sheath gas, for example at a flow rate between 1 liter/min and 40 liters/min.

At the end of step iii) of thermal plasma treatment according to the method of production, a powder of an ODS alloy is obtained.

The particles of this powder generally have a size close to or identical to that of the precursor powder obtained at the end of the milling step ii).

Regarding their microstructure, the particles of the ODS alloy powder comprise the oxide particles dispersed and wholly or partly crystallized in the volume of the metal matrix of the ODS alloy.

The oxide particles may be distributed uniformly throughout the volume of the metal matrix, and not only in a specified zone. In particular, they are not located preferentially at the grain boundaries of a powder particle of the ODS alloy, which would be deleterious for the mechanical properties of a material obtained from an ODS alloy powder (cracks, lower toughness, etc.).

The isotropic microstructure of the reinforced alloy notably guarantees uniform mechanical properties throughout the powder, and therefore in a material optionally manufactured with this powder, regardless of the direction of mechanical stressing of this material. The oxide particles may comprise at least one oxide selected from $Y_2O_3$, $TiO_2$, $Al_2O_3$, $HfO_2$, $SiO_2$, $ZrO_2$, $ThO_2$, $MgO$, $Al_2O_3$, $Y_2Ti_2O_7$, $Y_2TiO_5$.

Generally, when the additional powder only contains a single intermediate, typically a metal oxide, it is incorporated directly in the composition of the oxide particle dispersed in the ODS alloy, or is located partially in the matrix if a part of the additional powder has not precipitated.

When the additional powder comprises several intermediates, one or more types of chemical combinations between these compounds may be produced, which may lead to the formation of mixed oxides. For example, when the additional powder comprises yttrium oxide $Y_2O_3$ and titanium hydride $TiH_2$, at least one oxide selected from $Y_2Ti_2O_7$, $Y_2TiO_5$, $YTiO_3$, $YTi_2O_6$ may make up all or part of the oxide particle of the ODS alloy. Most often, when the oxide comprises yttrium and/or titanium, it is an oxide of pyrochlore structure such as for example $Y_2Ti_2O_7$.

The oxide particles formed in the ODS alloy may have a median diameter ($d_{50}$) between 1 nm and 500 nm. Preferably, it is between 1 nm and 200 nm, or even between 1 nm and 150 nm: they are therefore nanoparticles. Unexpectedly, such a result may be obtained by the method of production of the invention without using a quench ring incorporated in the plasma torch.

Most often, some or all of the particles of the reinforced alloy powder are spherical, or at least spheroidal.

The average circularity coefficient of the particles of the reinforced alloy powder (typically for 80 to 100 wt. % of the crystalline oxide particles, preferably 90% to 100%, even more preferably for 100%) may thus be between 0.95 and 1, or even between 0.98 and 1. The closer the value of this coefficient for a powder is to 1, the greater is the proportion of the particles of this powder that have a near-spherical morphology.

Figure 6:
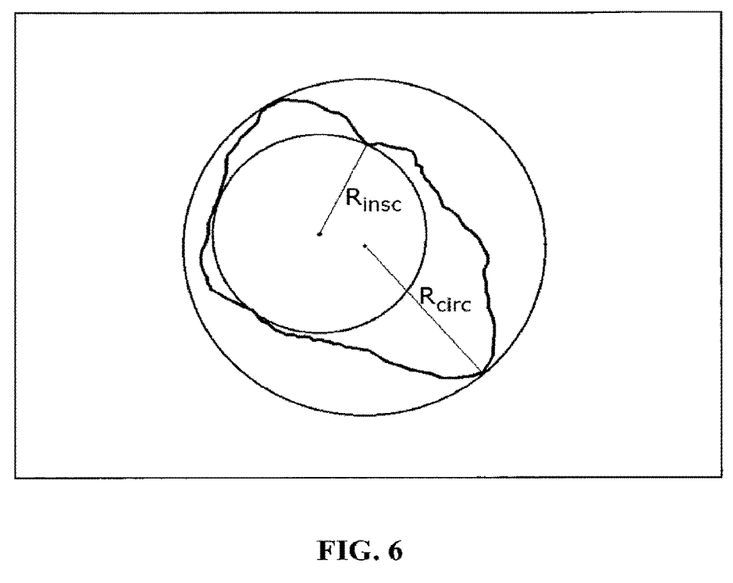
FIG. 6 is a diagram illustrating the parameters $R_{inscr}$ and $R_{circ}$ necessary for calculating the circularity of a powder grain from a photograph taken for a given angle.

As stated in the work of G. Mollon "Mécanique des matériaux granulaires" [Mechanics of granular materials], INSA de Lyon, 2015 (in particular pages 23 and 24) [reference 7] available from the following website:
"http://guilhem.mollon.free.fr/Telechargements/Mechanique_des_Materiaux_Granulaires.pdf",
and according to standard ISO 9276-6 (edition 2008), the circularity coefficient of a particle is a shape descriptor that can be calculated using the following formula, from the radius of the circle fully inscribed in the particle ($R_{inscr}$) and the radius of the circle that fully circumscribes the particle ($R_{circ}$), these radii being shown in FIG. 6 taken from reference [7]

$$\text{Circularity} = \sqrt{\frac{R_{insc}}{R_{circ}}}$$

In practice, the average circularity coefficient of a powder can be obtained from photographs of the particle and automated numerical analysis. Preferably, several photographs of the same particle are taken at different angles. The circularity averaged for these different angles is then calculated. Once this operation had been carried out on several grains, the average for all these grains, of the circularity averaged for each grain, gives the average circularity coefficient of the powder.

From an instrumental standpoint, the average circularity coefficient of a powder can be obtained automatically using an instrument such as the "CAMSIZER Dynamic Image Analyzer" marketed by the company HORIBA Scientific.

Regarding its composition, the reinforced alloy may further comprise by weight at least one of the following elements:
from 10 to 5000 ppm of silicon;
from 10 to 100 ppm of sulfur;
less than 20 ppm of chlorine;
from 2 to 10 ppm of phosphorus;
from 0.1 to 10 ppm of boron;
from 0.1 to 10 ppm of calcium;
less than 0.1 ppm of each of the following elements: lithium, fluorine, heavy metals, Sn, As, Sb.

These elements are most often contained initially in the master alloy. Since the chemical composition of the parent metal powder is not generally modified in r the course of the method of production of the invention, these elements are in this case present unchanged in the metal matrix.

Since all or part of the metal matrix and/or of the oxide particles that it contains may be crystalline, the reinforced alloy powder itself may be wholly or partly crystalline (preferably completely crystalline).

The microstructure of the particles of the reinforced alloy powder may preferably be monocrystalline (all the particles have the same crystalline structure), or may also be polycrystalline (the particles may have different crystalline structures).

The high proportion of reinforced alloy powder that is crystalline may be put to good use in methods of manufacture of the cold spraying type.

Other characteristics of microstructure and/or of composition of the reinforced alloy obtained by the method of production of the invention will be stated hereunder.

The invention also relates to a reinforced alloy powder obtained or obtainable by the method of production as defined in the present description, notably in one or more of the variants described for this method, such as for example the microstructure and/or the composition of the reinforced alloy powder.

The invention relates more particularly to a reinforced alloy powder whose grains forming the particles of the powder comprise a metal matrix, in the volume of which crystalline oxide particles are dispersed.

As far as the inventors are aware, an ODS alloy has never been obtained directly in the form of powder, which notably has the advantage of providing good control of the precipitates, to be usable in a cold forming process (for example of the "cold spraying" type) and/or to obtain an ODS alloy (for example an ODS steel) by an additive manufacturing process, having an improved density. This direct production in the form of powder (therefore in the form of a divided, pulverulent material), and not in the form of a material that is already densified, notably has the advantage of allowing direct use, optionally continuous for example in batch mode, of the reinforced alloy powder according to the invention in a method of densification making it possible, as stated hereunder, to obtain a massive material, and more particularly a component.

The proportion by weight of the oxide particles that are crystalline is preferably such that the crystalline oxide particles comprise by weight 80% to 100% (preferably 90% to 100%, even more preferably 100%) of the metal atom contained in the whole of the reinforced alloy. This metal atom corresponds to that present initially in the intermediate, for example yttrium, titanium, iron, chromium, tungsten, silicon, zirconium, thorium, magnesium, aluminum or hafnium.

In other words, the metal matrix may comprise, in dissolved form (typically at the atomic scale, for example in solid solution) and/or in the form of particles of amorphous oxide, relative to the total weight of said metal atom contained in the whole of the reinforced alloy:
preferably 0% to 20% by weight of said metal atom;
even more preferably 0% to 10%, or even 0% of said metal atom.

The weight of the metal atom in the different zones of the reinforced alloy can be measured for example using X-ray microanalysis by EDX by transmission electron microscopy (TEM) (for example for a control zone that is extrapolated to the whole of the reinforced alloy), typically for measurement in the metal matrix. If applicable, the weight of the metal atom contained in the particles of amorphous oxide and/or the crystalline oxide particles can also be determined by chemical analysis, or determined by taking into account that this weight is the complement to the weight of metal atom that is contained in just the metal matrix (i.e. that the sum of these two weights is equivalent to the total weight of metal atom initially present in the additional powder).

The particles of the reinforced alloy may have an average circularity coefficient that is between 0.95 and 1.

The metal matrix of the reinforced alloy may be crystalline.

Preferably, the oxide particles are distributed uniformly in the volume of the metal matrix, in particular the oxide particles are preferably not present at the grain boundaries of the particles of powder of the reinforced alloy.

The metal matrix may be made up of an iron-based alloy, a nickel-based alloy or an aluminum-based alloy.
The iron-based alloy may comprise, by weight:
10% to 30% of chromium.
10% to 30% of aluminum.
8% to 25% of chromium and 3 to 8 wt. % of aluminum.
The iron-based alloy may be a steel, for example an austenitic, martensitic or ferritic steel, if applicable respecting the above compositions by weight.
The nickel-based alloy may comprise, by weight:
10% to 40% of chromium, such as for example Inconel® 600 comprising 14% to 17% of chromium.
10% to 40% of chromium, 0.2% to 5% of aluminum, 0.3% to 5% of titanium, 0% to 5% of tungsten, 0% to 2% of molybdenum and 0% to 2% of tantalum, such as for example Inconel® 625 or 718 comprising 20% to 23% or 17% to 21% of chromium, respectively.
10% to 30% of aluminum.
Generally, the nickel-based alloy may be an Inconel®.

When the metal matrix is made up of an iron-based alloy or a nickel-based alloy, the reinforced alloy may comprise 0.1% to 2.5% by weight of oxide particles, or even 0.1% to 0.5%.

The aluminum-based alloy may comprise from 0% to 1% by weight of iron (or even from 0% to 0.5% of iron), from 0% to 1% of silicon and from 0% to 1% of magnesium.

There are for example the following compositions by weight:
- aluminum alloy 1100 comprising 0.95% of iron, 0.05% of magnesium, 0.2% of copper, and 0.1% of zinc;
- aluminum alloy 6262 comprising up to 0.7% of iron;
- an aluminum alloy of series 1000, for example such as aluminum alloy 1050 containing less than 0.4% of iron, less than 0.25% of silicon and no magnesium;
- an aluminum alloy of series 6000, for example such as aluminum alloy 6063 containing less than 0.35% of iron, less than 0.6% of silicon and less than 0.9% of magnesium.

Iron is most often an impurity, and silicon improves the fluidity of the alloy.

When the metal matrix consists of an aluminum-based alloy, the reinforced alloy may comprise 0.2% to 5% by weight of oxide particles.

The proportion of oxide particles in the reinforced alloy is such that it may comprise 0.1% to 0.5% by weight of oxide particles.

If there is still a part of the additional powder that has not precipitated in the course of the method of production of the invention, the reinforced alloy may comprise 0.1 to 2.5 wt. % of an atom of the intermediate (typically the metal atom) intended to form the oxide particles, preferably from 0.1% to 1%, or even less than 0.1%. The intermediate is then generally located in the metal matrix. This percentage reflects the degree of precipitation of the intermediate or intermediates in the form of oxide particles. It may notably be measured by X-ray microanalysis (for example EDX analysis with the transmission electron microscope) focused on a volume of the metal matrix not comprising oxide particles.

If it is present in the reinforced alloy, the intermediate intended to form the oxide particles may be $YFe_3$, $Y_2O_3$, $Fe_2O_3$, $Fe_2Ti$, $FeCrWTi$, $TiH_2$, $TiO_2$, $Al_2O_3$, $HfO_2$, $SiO_2$, $ZrO_2$, $ThO_2$, $MgO$ or mixtures thereof.

Starting from this composition, the oxide particles may comprise at least one oxide selected from $Y_2O_3$, $TiO_2$, $Al_2O_3$, $HfO_2$, $SiO_2$, $ZrO_2$, $ThO_2$, $MgO$ $Al_2O_3$, $Y_2Ti_2O_7$, $Y_2TiO_5$.

The oxide particles may have a median diameter ($d_{50}$) between 1 nm and 500 nm, or even between 1 nm and 200 nm.

The reinforced alloy may further comprise by weight at least one of the following elements:
- from 10 to 5000 ppm of silicon;
- from 10 to 100 ppm of sulfur;
- less than 20 ppm of chlorine;
- from 2 to 10 ppm of phosphorus;
- from 0.1 to 10 ppm of boron;
- from 0.1 to 10 ppm of calcium;
- less than 0.1 ppm of each of the following elements: lithium, fluorine, heavy metals, Sn, As, Sb.

These elements are most often present in the metal matrix.

The invention also relates to the use of a reinforced alloy powder as defined above (i.e. the reinforced alloy powder obtained or obtainable by the method of production of the invention or the reinforced alloy powder whose grains forming the particles of the powder comprise a metal matrix, in the volume of which crystalline oxide particles are dispersed) according to one or more of the variants described in the present description, use in which the reinforced alloy powder of the invention is subjected to a process of densification of the reinforced alloy powder, in order to produce a massive material (more particularly a component) or to a method of coating for coating a substrate with the reinforced alloy powder (more particularly a small thickness, typically between 20 µm and 50 mm).

As stated above, the characteristics of the reinforced alloy powder according to the invention are particularly suitable for densification thereof with a view to obtaining a massive material, more particularly in the form of a component or deposition thereof on a substrate in the form of a coating (which depending on the case, in particular for a relatively large thickness, may also be regarded as a layer of a densified material).

The method of densification may be selected from a wide range of methods of densification of a powder (in particular of an ODS alloy powder) that are familiar to a person skilled in the art, for example an additive manufacturing process or a powder injection molding process, in order to manufacture the massive material, more particularly the component or the coating.

The principle of additive manufacturing (also called "3D printing") is that of a generative manufacturing process, which comes down to two steps that are repeated until the finished massive product is obtained:
1. Generation of a layer of material to a fixed contour and thickness. The material is only deposited where it is needed;
2. Production of the next layer by adding material on top of the preceding layer. Manufacture may be summarized as so-called "stepwise" manufacture.

Additive manufacturing is described in more detail for example in the following documents, which are incorporated in the present description by reference:
- [reference 8]: F. Laverne et al., "Fabrication additive—Principes généraux" [Additive manufacturing—General Principles], Techniques de l'ingénieur, Part BM7017 V2 (published Feb. 10, 2016);
- [reference 9]: H. Fayazfara et al., "Critical review of powder-based additive manufacturing of ferrous alloys: Process parameters, microstructure and mechanical properties", Materials & Design, Volume 144, 2018, pages 98-128.
- [reference 10]: T. DebRoy et al., "Additive manufacturing of metallic components—Process, structure and properties", Progress in Materials Science, Volume 92, 2018, pages 112-224.
- [reference 11]: Ministry of Economics and Finance, French Republic, "Prospective—future of additive manufacturing—final report", edition of January 2017, ISBN: 978-2 11-151552-9; in particular Annex 2 (pages 205 to 220) notably where it describes the methods of additive manufacture using a metal powder (annex 2, Methods of manufacture, paragraphs 3, 4 and 5).

More particularly, the additive manufacturing process is selected from a method of selective laser melting (SLM) or "Laser Powder Bed Fusion" (L-PBF), selective electron beam melting (EBM) or "Electron Powder Bed Fusion" (E-PBF), selective laser sintering (SLS), laser spraying ("Direct Metal Deposition" (DMD) or "laser cladding") or binder jetting.

The principle of powder injection molding is injection molding of components starting from a mixture of metal or ceramic powder and polymer binder, followed by debinding (binder removal) of the component in a furnace under a controlled atmosphere (typically an atmosphere similar or identical to the gaseous milling medium described above with the exception of hydrogen), then by consolidation of the latter by sintering. The sintering temperature is for example between 350° C. and 1220° C.

Depending on the material used, in English it is called "Ceramic Injection Molding" (CIM) or "Metal Injection Molding" (MIM).

Powder injection molding is described in more detail for example in the following document, which is incorporated in the present description by reference:

[reference 12]: D. Moinard et al., "Procédés de frittage PIM" [PIM sintering techniques], Techniques de l'ingénieur, Part M3320 VI (published Jun. 10, 2011).

With regard to the coating process, it may be selected from a coating process familiar to a person skilled in the art, for example a cold spraying process or a hot spraying process.

The principle of cold spraying consists of accelerating a gas (such as for example nitrogen, helium or argon), generally heated to a temperature from 100° C. to 700° C., to supersonic velocities in a nozzle of the "De Laval" type, and then the powdered material to be sprayed (here, the reinforced ODS alloy powder according to the invention) is fed into the high pressure part (between 10 bar and 40 bar) of the nozzle and is sprayed in the "nonmolten state" onto the surface of the component to be coated at a velocity that may range from 600 m/s to 1200 m/s. On coming into contact with the component, the particles undergo plastic deformation and form on impact a dense and adherent coating.

The advantage of this embodiment is the absence of fusion of the particles, and therefore a very low risk of oxidation and possible incorporation in a hostile medium.

Cold spraying is described in more detail for example in the following document, which is incorporated in the present description by reference:

[reference 13]: A. Papyrin, "Cold Spray Technology", ISBN-13:978-0-08-045155-8, 2007 edition.

The hot spraying process may be selected from a flame hot spraying process, an electric arc spraying process between two wires or a blown plasma spraying process.

Hot spraying is described in more detail for example in the following document, which is incorporated in the present description by reference:

[reference 14]: A. Proner, "Revêtements par projection thermique" [Hot spray coatings], Techniques de l'ingénieur, Part M1645 V2 (published Sep. 10, 1999).

The invention is supplemented advantageously with the following features, used alone or according to any one of their technically possible combinations.

DETAILED ACCOUNT OF THE INVENTION

In the present description of the invention, a verb such as "comprise", "incorporate", "include", "contain" and its conjugated forms are open terms and therefore do not exclude the presence of additional element(s) and/or step(s) that are added to the initial element(s) and/or step(s) stated after these terms. However, these open terms further relate to a particular embodiment in which only the initial element(s) and/or step(s), excluding any other, are intended, in which case the open term additionally covers the closed term "consist in", "constitute", "consist of" and its conjugated forms.

The use of the indefinite article "a" or "an" for an element or a step does not exclude, unless stated otherwise, the presence of a plurality of elements or steps.

Any reference mark in parentheses in the claims is not to be interpreted as limiting the scope of the invention.

Moreover, unless stated otherwise:
the values at the limits are included in the ranges of parameters indicated;
the temperatures indicated are considered for implementation at atmospheric pressure;
any percentage by weight of a component of the reinforced alloy, of the master alloy, or of the powder mixture is relative to the total weight of this alloy or this mixture.

In the present description, "base alloy" of the metal notably included in the composition of the master alloy or of any other alloy, means any alloy based on the metal in which the content of the metal is at least 50 wt. % of the metal of the alloy, in particular more than 90 wt. %, or even more than 95 wt. %. The base metal is for example iron, nickel or aluminum. The base alloy is preferably suitable for use in the nuclear industry and/or under irradiation.

The expression "according to one or more of the variants described in the present description" for a material/an element refers notably to the variants that relate to the chemical composition and/or the proportion of the constituents of this material and of any additional chemical species that it may optionally contain and notably to the variants that relate to the chemical composition, the structure, the geometry, the spatial arrangement and/or the chemical composition of this element or of a sub-element that is a constituent of the element. These variants are for example those stated in the claims.

Other aims, features and advantages of the invention will now be stated in the following description of particular embodiments of the invention, given for purposes of illustration and nonlimiting, referring to the appended FIGS. 1A to 6.

BRIEF DESCRIPTION OF THE FIGURES

FIGS. 5A to 5D show a series of photographs for analyzing an oxide precipitate contained in the matrix of an ODS alloy powder obtained by the method of production of the invention.

DESCRIPTION OF PARTICULAR EMBODIMENTS

The particular embodiments given hereunder relate to the method of production of the invention, as well as the composition and the microstructure of the reinforced alloy obtainable thereby.

1. Implementation of the method for producing a reinforced alloy according to the invention In a ball mill, under a hydrogen atmosphere, a parent metal powder consisting of an iron-based master alloy (composition by weight: 14% Cr, 11 W, 0.3% Si, 0.3% Mn and 0.2% Ni, 1000 ppm C, and remainder Fe) is mixed with an additional powder, comprising by weight relative to the total mixture of powders, 0.3% of a titanium hydride ($TiH_2$) powder and 0.3% of an yttrium oxide ($Y_2O_3$) powder as intermediates intended to form oxide particles.

The powder mixture is milled for 176 hours in order to form, by mechanical synthesis, a precursor powder comprising a metal matrix consisting of the master alloy in which titanium, yttrium and oxygen atoms are incorporated.

At this stage of the method of production of the invention, no oxide particle in the form of precipitates has yet formed.

The precursor powder is then fed into an inductively coupled radio frequency plasma torch that is able to deliver up to 80 kW of power (model PL50 marketed by the company Tekna).

This type of torch is described for example in the document "Kim, K. S., Moradian, A., Mostaghimi, J., Soucy, G. Modeling of Induction Plasma Process for Fullerene Synthesis: Effect of Plasma Gas Composition and Operating Pressure; Plasma Chemistry and Plasma Processing 2010, 30, 91-110".

The plasma torch comprises a ceramic confinement tube immersed in cooling water circulating at high speed along its external wall. Cooling of the tube is essential, to protect it from the large thermal flux generated by the plasma. Around the confinement tube and beyond the cooling channel there is the induction coil embedded in the body of the plasma torch and connected to the high-frequency generator. This coil generates the alternating magnetic field that creates the plasma medium.

Inside the confinement tube, a plasma gas (also called central gas) is injected continuously.

To protect the inside wall of the ceramic confinement tube, a sheath gas is introduced in a vortex along the inside wall of the confinement tube by means of a quartz intermediate tube placed inside the confinement tube.

The precursor powder is injected directly in the center of the plasma discharge via a water-cooled injector positioned in the first third upstream of the reaction chamber of the plasma torch. It is then heated in flight and melted. Since the induction plasmas operate without an electrode in contact with the plasma gas, contamination-free treatment can be carried out.

The precursor powder obtained beforehand is subjected to a thermal plasma according to the operating conditions shown in Table 1. The gas flow rates are as follows:

plasma gas (argon)=30 L/min;

principal sheath gas (argon)=from 80 to 100 L/min;

additional sheath gas (helium or hydrogen)=from 0 to 30 L/min.

The proportion by weight of ODS powder according to the invention (more particularly the crystalline oxide particles additionally having an average circularity coefficient that is between 0.95 and 1) relative to the total weight of powder mixture treated is shown in the last column of Table 1. It is estimated to a first approximation by an analysis of the SEM photographs of the powders obtained at the end of the method of production of the invention.

TABLE 1

|  | Flow rate of precursor powder (g/min) | Plasma power of the plasma torch (kW) | Reactor pressure (kPa) | Flow rate of the principal sheath gas (Ar) (L/min) | Flow rate of the additional sheath gas (He) (L/min) | Flow rate of the additional sheath gas ($H_2$) (L/min) | Proportion of powders with spherical grains comprising crystalline oxide particles (wt %) |
|---|---|---|---|---|---|---|---|
| Test 1 | 21 | 22 | 20.6 | 100 | 0 | 0 | <5% |
| Test 2 | 21 | 31 | 34.5 | 100 | 0 | 4 | ~60% |
| Test 3 | 29 | 25 | 41.4 | 100 | 10 | 0 | ~80/90 |
| Test 4 | 12 | 25 | 41.4 | 100 | 10 | 0 | 100% |
| Test 5, 6 and 7 | 40 | 60 | 96.6 | 100 | 30 | 0 | ~20 to 30% |
| Test 8 | 29 | 60 | 68.9 | 80 | 30 | 0 | ~20 to 30% |
| Test 9 | 29 | 60 | 41.4 | 80 | 30 | 0 | ~20 to 30% |
| Test 10 | 29 | 60 | 96.6 | 80 | 30 | 0 | ~20 to 30% |
| Test 11 | 29 | 60 | 41.4 | 100 | 10 | 0 | ~20 to 30% |
| Test 12 | 12 | 25 | 41.4 | 100 | 10 | 0 | 100% |
| Test 17 | 15 | 40 | 68.9 | 60 | 40 | 0 | 100% |
| Test 18 | 15 | 40 | 68.9 | 80 | 0 | 20 | 90 to 100% |
| Test 19 | 15 | 35 | 68.9 | 80 | 0 | 20 | ~50 to 60% |

Table 1 shows that the proportion of oxide that has precipitated is higher for moderate plasma torch powers (typically between 10 kW and 40 kW, or even between 10 kW and 30 kW) and a moderate flow rate of injection of the precursor powder into the plasma torch (typically <30 g/min).

Thus, in tests 4, 12, 17 and 18, an ODS alloy powder with spherical particles and in which 100% of the oxide nanoreinforcements have seeded is obtained with:
- a powder flow rate of 12 g/min (tests 4 and 12) or 15 g/min (tests 17 and 18),
- a power for the plasma torch of 25 kW (tests 4 and 12) or 40 kW (tests 17 and 18),
- a pressure of 6 psi or 41 369 Pa (tests 4 and 12) or 10 psi or 68 947 Pa (tests 17 and 18) in the reaction chamber of the plasma torch,
- gas flow rates of 30 liters/min of argon for the central gas, 100 liters/min of argon for the principal sheath gas and 10 liters/min of helium for the additional sheath gas (tests 4 and 12); or gas flow rates of 30 liters/min of argon for the central gas, 60 liters/min of argon for the principal sheath gas and 40 liters/min of helium for the additional sheath gas (test 17); or gas flow rates of 30 liters/min of argon for the central gas, 80 liters/min of argon for the principal sheath gas and 20 liters/min of hydrogen for the additional sheath gas (test 18).

Comparison of tests 4 and 12 also shows perfect reproducibility of the method of production of the invention, and therefore control of the characteristics of the ODS alloy powder that it advantageously makes it possible to obtain.

Typically, to obtain an iron-based ODS alloy powder with spherical particles (more particularly with an average circularity coefficient that is between 0.95 and 1) and comprising a defined proportion of nanoreinforcements (with average size typically between 50 nm and 500 nm, preferably between 50 nm and 200 nm) of oxide uniformly dispersed in the metal matrix of the ODS alloy, a person skilled in the art may for example use the following operating conditions for the plasma torch, the priority parameters to be acted upon separately or together being the power of the plasma torch and the flow rate of precursor powder:

⇒ for 20 to 30 wt. % of crystalline oxide particles relative to the initial weight of the additional powder (i.e. 704 to 80% of the additional powder has not produced crystalline oxide particles):
- power of the plasma torch: between 40 kW and 80 kW (or even between 30 kW and 80 kW),
- flow rate of precursor powder: between 20 g/min and 45 g/min, and optionally at least one of the following operating conditions:
- pressure in the reaction chamber of the plasma torch: between 5 psi or 34 474 Pa and 14.5 psi (i.e. atmospheric pressure),
- flow rate of the principal sheath gas: between 80 L/min and 100 L/min,
- flow rate of the additional sheath gas: between 10 L/min and 40 L/min.

⇒ for more than 80 wt. % of crystalline oxide particles relative to the initial weight of the additional powder (i.e. less than 20% of the additional powder has not produced crystalline oxide particles):
- power of the plasma torch: between 20 kW and 40 kW (or even between 20 kW and 30 kW),
- flow rate of precursor powder: between 10 g/min and 30 g/min, and optionally at least one of the following operating conditions:
- pressure in the reaction chamber of the plasma torch: between 4 psi and 8 psi (i.e. between 27.6 kPa and 55.1 kPa),
- flow rate of the principal sheath gas: between 80 L/min (or even 60 L/min) and 100 L/min,
- flow rate of the additional sheath gas: between 10 L/min and 40 L/min.

2. Composition and microstructure of a reinforced alloy of the invention

Figure 2A:
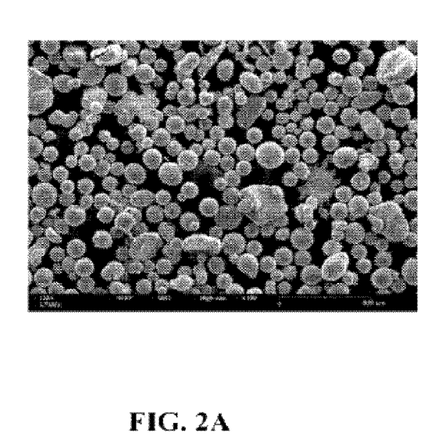
FIG. 2A (general view), 2B and 3A (sectional view) as well as 3B (zoom view of a section focusing on the oxide precipitates) show SEM photographs of a powder of a reinforced alloy obtained after the plasma treatment step iii) of the method of production of the invention.
Figure 2B:
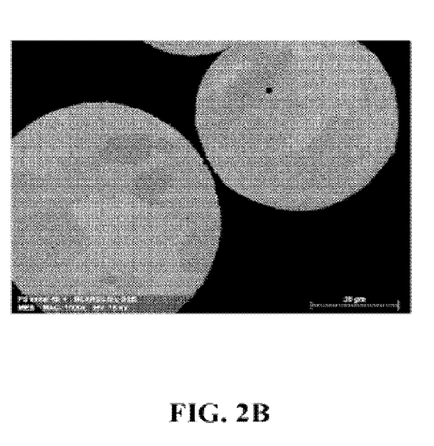
Figure 3A:
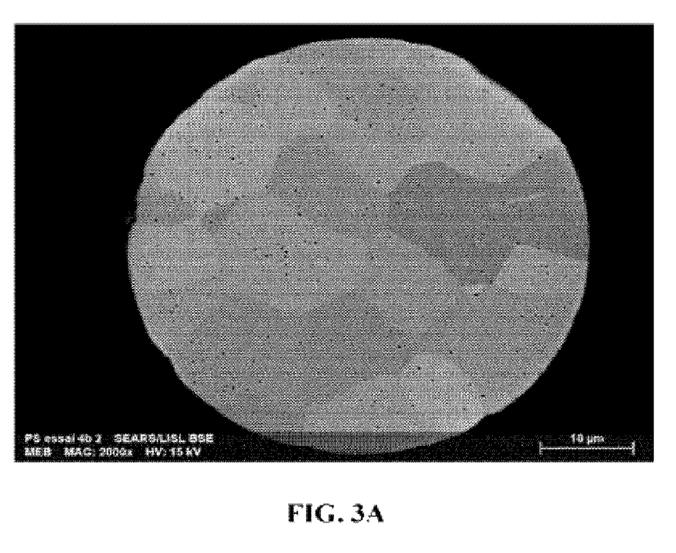
Figure 3B:
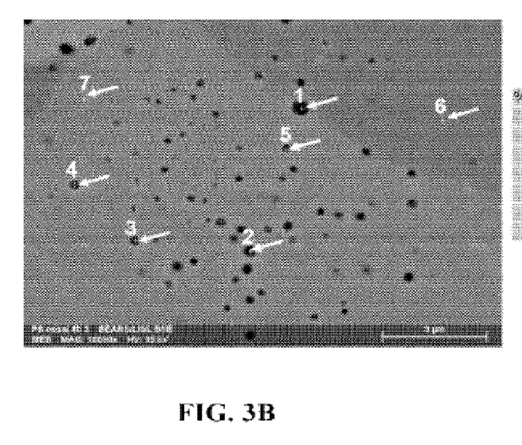
Figure 3C:
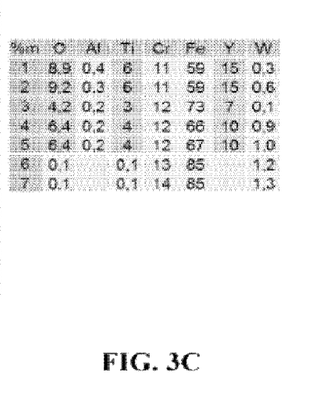
FIG. 3C is a table giving molar atomic percentages obtained by energy dispersive X-ray spectrometry (EDX) in the oxide precipitates identified by the numerical indices 1 to 7 in FIG. 3B.
Figure 4A:
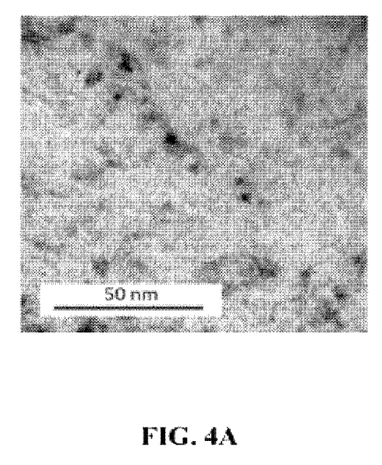
FIGS. 4A and 4B show a bright-field TEM photograph of a section of an ODS alloy obtained by the method of production of the invention.
Figure 4B:
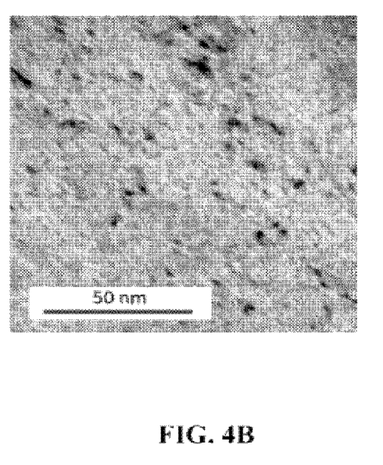

The precursor powder and the reinforced alloy powder obtained respectively at the end of the step of mechanical synthesis and then the step of precipitation of the oxides in the plasma torch according to test No. 4 are characterized by SEM (FIGS. 1A, 1B, 2A, 2B, 3A and 3B), TEM (FIGS. 4A and 4B) and EDX (table in FIG. 3C).

Figure 1A:
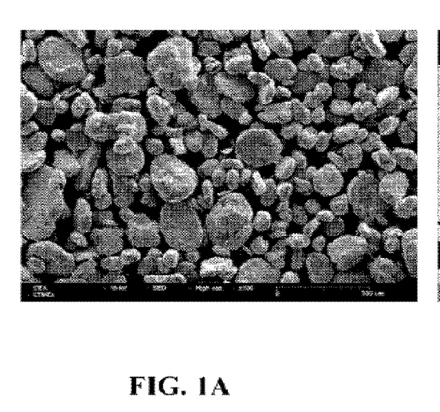
FIG. 1A (general view) and 1B (sectional view) show photographs obtained by scanning electron microscopy (SEM) of a precursor powder obtained after the milling step ii) of the method of production of the invention.
Figure 1B:
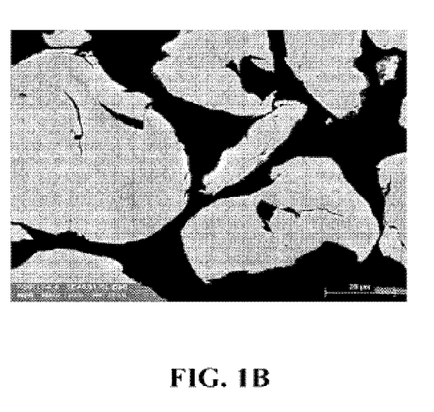

According to these analyses, the particles of the precursor powder are of variable shape (FIG. 1A) and have a chaotic noncrystalline microstructure not containing any oxide particle that has seeded to constitute a reinforcement of the master alloy (FIG. 1B).

However, by combining the milling step ii) and the plasma treatment step iii) according to the method of production of the invention, it is possible to obtain a reinforced alloy of the ODS type for which the powder particles are essentially spherical and/or spheroidal (FIGS. 2A, 2B and 3A) and are made up of grains consisting of a crystalline metal matrix in which crystalline oxide particles are incorporated uniformly, appearing in the form of black dots on a variable shade of gray background representing the metal matrix of the grains (FIGS. 2B, 3A and 3B). The crystalline oxide particles are nanoreinforcements, their median diameter $d_{50}$ being between 150 nm and 200 nm. Numerous precipitates smaller than 5 nm are also present.

EDX analyses were also carried out by SEM and TEM electron microscopy. They are presented in the table in FIG. 3C, which shows that the nanoreinforcements present in zones 1 to 5 in the particles of the ODS alloy powder are rich in titanium, yttrium and oxygen. In contrast, the corresponding EDX analyses conducted in zones 6 and 7 of the metal matrix show absence of oxygen, titanium, aluminum and yttrium in the matrix (mol %<0.1% to within the margin of uncertainty, or even zero when no value is stated, such as for aluminum and yttrium). These results prove that all the atoms of the additional powder that are intended to form the dispersed oxide particles have indeed precipitated in the form of nanoreinforcements within the particles of the ODS alloy powder, as can also be seen in the close-up views in FIGS. 4A and 4B.

Figure 5A:
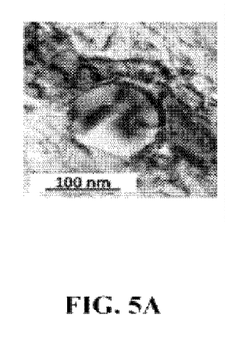
FIG. 5A obtained by bright-field TEM is centered on the oxide precipitate analyzed.
Figure 5B:
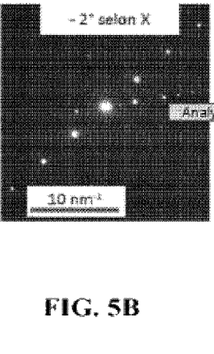
FIGS. 5B and 5C are photographs of TEM diffraction obtained at inclination of the sample holder by an angle of −2° relative to X, respectively in the raw form and in the annotated form after analysis for locating the diffraction spots corresponding to the matrix and to the oxide precipitate.
Figure 5C:
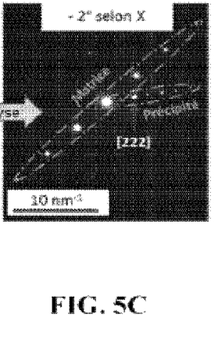
Figure 5D:
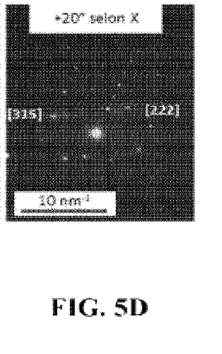
FIG. 5D is the corresponding annotated photograph obtained by inclination of the sample holder by an angle of −20° relative to X.

FIGS. 5B, 5C and 5D were obtained by TEM diffraction of the zone shown in FIG. 5A that is centered on an oxide precipitate of the ODS alloy of the invention. They have superlattice diffraction peaks (i.e. one spot in two is more luminous) that are characteristic of an oxide of the pyrochlore $Y_2Ti_2O_7$ type obtained conventionally in an iron-based ODS alloy.

The present invention is not in any way limited to the embodiments described and presented, and a person skilled in the art will be able to combine them and supply many variants and modifications on the basis of his general knowledge.

REFERENCES CITED

[1] C. Suryanarayana "Mechanical alloying and milling", Progress in Materials Science, 2001, 46, 1-184.

[2] D. J. Lloyd, "Particle reinforced aluminium and magnesium matrix composites"; International materials reviews, 1994, Vol. 39, No. 1, pages 1 to 23.

[3] Fan, X., Gitzhofer, F., Boulos, M. "Statistical Design of Experiments for the Spheroidization of Powdered Alumina by Induction Plasma Processing", J Therm Spray Tech 1998, 7 (2), 247-253.

[4] Jiang, X.-L., Boulos, M. "Induction Plasma Spheroidization of Tungsten and Molybdenum Powders", Transactions of Nonferrous Metals Society of China 2006, 16 (1), 13-17.

[5] Ye, R., Ishigaki, T., Jurewicz, J., Proulx, P., Boulos, M. I. "In-Flight Spheroidization of Alumina Powders in Ar—H2 and Ar—N2 Induction Plasmas", Plasma Chem Plasma Process 2004, 24 (4), 555-571.

[6] P. Fauchais, "Plasmas thermiques: aspects fondamentaux" ["Thermal plasmas: basic aspects"], Techniques de l'ingénieur, Part D2810 V1, 2005)

[7] G. Mollon "Mécanique des matériaux granulaires" [Mechanics of granular materials], INSA de Lyon, 2015 (in particular pages 23 and 24) [reference 7] available from the following website: "http://guilhem.mollon.free.fr/Telechargements/Mechanique_des_Materiaux_Granulaires.pdf"

[8] F. Laverne et al., "Fabrication additive—Principes généraux" [Additive manufacturing—General Principles], Techniques de l'ingénieur, Part BM7017 V2 (published Feb. 10, 2016);

[9] H. Fayazfara et al., "Critical review of powder-based additive manufacturing of ferrous alloys: Process parameters, microstructure and mechanical properties", Materials & Design, Volume 144, 2018, pages 98-128.

[10] T. DebRoy et al., "Additive manufacturing of metallic components—Process, structure and properties", Progress in Materials Science, Volume 92, 2018, pages 112-224.

[11] Ministry of Economics and Finance, French Republic, "Prospective—future of additive manufacturing—final report", edition of January 2017, ISBN: 978-2-11-151552-9.

[12] D. Moinard et al., "Procédés de frittage PIM" [PIM sintering techniques], Techniques de l'ingénieur, Part M3320 VI (published Jun. 10, 2011)

[13] A. Papyrin, "Cold Spray Technology", ISBN-13:978 0-08-045155-8, 2007 edition.

[14] A. Proner, "Revêtements par projection thermique" [Hot spray coatings], Techniques de l'ingénieur, Part M1645 V2 (published Sep. 10, 1999).

The invention claimed is:

1. A method for producing a reinforced alloy powder comprising particles each comprising a metal matrix and crystalline oxide particles dispersed in the metal matrix, the method comprising:
   (i) milling a powder mixture comprising (a) a parent metal powder comprising an iron-based alloy, a nickel-based alloy, or an aluminum-based alloy, as a master alloy, and (b) an additional powder comprising $YFe_3$, $Y_2O_3$, $Fe_2O_3$, $Fe_3Ti$, FeCrWTi, $TiH_2$, $TiO_2$, $Al_2O_3$, $HfO_2$, $SiO_2$, $ZrO_2$, $ThO_2$, and/or MgO, in a gaseous milling medium by a mechanical synthesis process, thereby producing a precursor powder comprising a metal matrix in which atoms of the additional powder are incorporated; and
   (ii) subjecting the precursor powder to a thermal plasma generated by a plasma torch comprising a plasma gas, thereby obtaining the reinforced alloy powder, the precursor powder being injected into the plasma torch via an injector at a flow rate in a range of from 10 to 19 grams/min, a plasma torch power in a range of from 20 to 40 kW, and a reaction chamber pressure in a range of from 25 to 100 kPa, an outside surface of the injector being swept with a sheath gas comprising a principal sheath gas and an additional sheath gas, the principal sheath being fed into the plasma torch, the additional sheath as having a hither thermal conductivity than the principal sheath gas and being infected into the plasma torch at a flow rate lower than a principal sheath as feed flow rate, wherein 80 to 100 wt. % of the particles of the reinforced alloy powder have an average circularity coefficient in a range of from 0.95 to 1.

2. The method of claim 1, wherein the master alloy is an iron-based alloy, and
   wherein the iron-based alloy comprises chromium in a range of from 10 to 30 wt. %.

3. The method of claim 1, wherein the master alloy is an iron-based alloy, and
   wherein the iron-based alloy comprises aluminum in a range of from 10 to 30 wt. %.

4. The method of claim 1, wherein the master alloy is an iron-based alloy, and
   wherein the iron-based alloy comprises chromium in a range of from 8 to 25 wt. % of and aluminum in a range of from 3 to 8 wt. %.

5. The method of claim 1, wherein the master alloy is an iron-based alloy, and
   wherein the iron-based alloy is a steel.

6. The method of claim 1, wherein the master alloy is a nickel-based alloy, and
   wherein the nickel-based alloy comprises chromium in a range of from 10 to 40 wt. %.

7. The method of claim 6, wherein the nickel-based alloy comprises the chromium in a range of from 10 to 40 wt. %, aluminum in a range of from 0.02 to 5 wt. %, titanium in a range of from 0.3 to 5 wt. %, tungsten in a range of from 0 to 5 wt. %, molybdenum in a range of from 0 to 2 wt. %, and tantalum in a range of from 0 to 2 wt. %.

8. The method of claim 1, wherein the master alloy is a nickel-based alloy, and
   wherein the nickel-based alloy comprises aluminum in a range of from 10 to 30 wt. %.

9. The method of claim 1, wherein the master alloy is an iron-based alloy or a nickel-based alloy, and
   wherein the powder mixture comprises the additional powder in a range of from 0.1 to 2.5 wt. %.

10. The method of claim 1, wherein the master alloy is an aluminum-based alloy, and
    wherein the aluminum-based alloy comprises iron in a range of from 0% to 0.5 wt. %, silicon in a range of from 0% to 0.3 wt. %, and magnesium in a range of from 0 to 1 wt. %.

11. The method of claim 1, wherein the master alloy is an aluminum-based alloy, and
    wherein the powder mixture comprises the additional powder in a range of from 0.2 to 5 wt. %.

12. The method of claim 1, wherein the powder mixture comprises the additional powder in a range of from 0.1 to 0.3 wt. %.

13. The method of claim 1, wherein the atoms of the additional powder incorporated in the metal matrix comprise yttrium, titanium, iron, chromium, tungsten, silicon, zirconium, thorium, magnesium, aluminum, and/or hafnium.

14. The method of claim 1, wherein the plasma torch is an inductively coupled radio frequency plasma torch, a blown arc torch, or a transferred arc torch.

15. The method of claim 1, wherein the plasma gas comprises argon, helium, and/or nitrogen.

16. The method of claim 1, wherein the plasma gas is injected into the plasma torch at a flow rate in grange of from 10 to 40 liters/min.

17. The method of claim 1, wherein, in the subjecting (ii), the plasma torch power is in a range of from 25 to 40 kW, and the reaction chamber pressure of the plasma torch is in a range of from 40 to 70 kPa.

18. The method of claim 1, wherein the additional sheath gas is injected at a flow rate in a range of from 1 to 40 liters/min.

19. The method of claim 1, wherein the principal sheath gas is argon.

20. The method of claim 1, wherein the additional sheath gas is helium, nitrogen, or hydrogen.

21. The method of claim 19, wherein the additional sheath gas is helium, nitrogen, or hydrogen.

22. The method of claim 20, wherein the principal sheath gas is argon, and
wherein the additional sheath gas is helium or hydrogen.

23. The method of claim 1, wherein the atoms of the additional powder incorporated in the metal matrix comprise yttrium.

24. The method of claim 1, wherein the atoms of the additional powder incorporated in the metal matrix comprise titanium.

25. The method of claim 1, wherein the atoms of the additional powder incorporated in the metal matrix comprise iron.

26. The method of claim 1, wherein the atoms of the additional powder incorporated in the metal matrix comprise chromium.

27. The method of claim 1, wherein the atoms of the additional powder incorporated in the metal matrix comprise tungsten.

28. The method of claim 1, wherein the atoms of the additional powder incorporated in the metal matrix comprise silicon.

29. The method of claim 1, wherein the atoms of the additional powder incorporated in the metal matrix comprise zirconium.

30. The method of claim 1, wherein the atoms of the additional powder incorporated in the metal matrix comprise thorium or magnesium.

31. The method of claim 1, wherein the atoms of the additional powder incorporated in the metal matrix comprise aluminum.

32. The method of claim 1, wherein the atoms of the additional powder incorporated in the metal matrix comprise hafnium.

33. The method of claim 1, wherein the additional powder comprises $YFe_3$.

34. The method of claim 1, wherein the additional powder comprises $Y_2O_3$.

35. The method of claim 1, wherein the additional powder comprises $Fe_2O_3$.

36. The method of claim 1, wherein the additional powder comprises $Fe_2Ti$.

37. The method of claim 1, wherein the additional powder comprises FeCrWTi.

38. The method of claim 1, wherein the additional powder comprises $TiH_2$.

39. The method of claim 1, wherein the additional powder comprises $TiO_2$.

40. The method of claim 1, wherein the additional powder comprises $Al_2O_3$.

41. The method of claim 1, wherein the additional powder comprises $HfO_2$.

42. The method of claim 1, wherein the additional powder comprises $SiO_2$.

43. The method of claim 1, wherein the additional powder comprises $ZrO_2$.

44. The method of claim 1, wherein the additional powder comprises $ThO_2$.

45. The method of claim 1, wherein the additional powder comprises MgO.

* * * * *